US012591710B2

(12) United States Patent
Robinson

(10) Patent No.: US 12,591,710 B2
(45) Date of Patent: Mar. 31, 2026

(54) OBFUSCATING DATA IN CONTROLLER AREA NETWORK MESSAGES FOR TRANSPORT REFRIGERATION UNITS

(71) Applicant: Carrier Corporation, Palm Beach Gardens, FL (US)

(72) Inventor: James Robinson, Camillus, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 285 days.

(21) Appl. No.: 18/300,121

(22) Filed: Apr. 13, 2023

(65) Prior Publication Data

US 2023/0334177 A1 Oct. 19, 2023

Related U.S. Application Data

(60) Provisional application No. 63/332,113, filed on Apr. 18, 2022.

(51) Int. Cl.
*G06F 21/62* (2013.01)
*H04L 12/40* (2006.01)

(52) U.S. Cl.
CPC .......... *G06F 21/6254* (2013.01); *H04L 12/40* (2013.01); *H04L 2012/40215* (2013.01)

(58) Field of Classification Search
CPC ................. G06F 21/6254; H04L 12/40; H04L 2012/40215
USPC ........................................................ 713/164
See application file for complete search history.

(56) References Cited

U.S. PATENT DOCUMENTS

| | | | |
|---|---|---|---|
| 1,310,719 A | 7/1919 | Vernam | |
| 10,875,497 B2 * | 12/2020 | Srnec ...................... | B60R 25/08 |
| 11,135,894 B2 * | 10/2021 | Andrade Dias ....... | H02J 7/0024 |
| 11,203,262 B2 * | 12/2021 | Schumacher ............ | H02J 7/34 |
| 11,420,495 B2 * | 8/2022 | Schumacher ...... | B60H 1/00985 |
| 11,554,638 B2 * | 1/2023 | Schumacher ........ | B60H 1/0045 |
| 11,838,884 B1 * | 12/2023 | Dergosits .............. | G06F 1/3234 |
| 12,097,751 B2 * | 9/2024 | Briscoe .................. | G07C 5/004 |
| 2002/0184521 A1 * | 12/2002 | Lucovsky ............... | H04L 67/62 |
| | | | 726/6 |
| 2015/0033016 A1 * | 1/2015 | Thornton .............. | H04L 9/0869 |
| | | | 713/171 |
| 2016/0342531 A1 * | 11/2016 | Sharma ............... | G06F 12/1408 |
| 2018/0176008 A1 * | 6/2018 | Tsuyuzaki ............. | H04L 9/0852 |
| 2018/0295112 A1 * | 10/2018 | Coppola ................ | H04W 4/48 |
| 2019/0044933 A1 * | 2/2019 | De Andrade ....... | H04L 63/0823 |
| 2019/0173862 A1 * | 6/2019 | Kim ........................ | H04L 9/083 |
| 2019/0229901 A1 * | 7/2019 | Elbaz ........................ | H04L 9/14 |

(Continued)

FOREIGN PATENT DOCUMENTS

CN 105471874 A 4/2016

OTHER PUBLICATIONS

European Search Report for Application No. 23160556.9, Issued Oct. 2, 2023, 7 Pages.

*Primary Examiner* — Thanh T Le
(74) *Attorney, Agent, or Firm* — CANTOR COLBURN LLP

(57) ABSTRACT

A method of securing communications in a transport refrigeration unit is provided. The method including: generating a CAN data; obfuscating the CAN data to generate an obfuscated CAN data; transmitting the obfuscated CAN data; receiving the obfuscated CAN data by at least one of a node or a main micro; and de-obfuscating the obfuscated CAN data to generate the CAN data.

12 Claims, 4 Drawing Sheets

| INPUT | | OUTPUT |
|---|---|---|
| A | B | A⊕B |
| FALSE | FALSE | FALSE |
| FALSE | TRUE | TRUE |
| TRUE | FALSE | TRUE |
| TRUE | TRUE | FALSE |

(56)                    References Cited

U.S. PATENT DOCUMENTS

| | | | | |
|---|---|---|---|---|
| 2019/0324450 A1* | 10/2019 | Lurie | ................ | H04L 12/40026 |
| 2019/0327212 A1 | 10/2019 | Nakagawa | | |
| 2020/0036710 A1* | 1/2020 | Khanna | ............... | H04W 12/041 |
| 2020/0052892 A1* | 2/2020 | Chhabra | ............... | H04L 9/0631 |
| 2020/0092129 A1* | 3/2020 | Lin | ..................... | H04L 12/4625 |
| 2020/0112439 A1* | 4/2020 | Kalaiselvam | ......... | H04L 9/3234 |
| 2021/0226661 A1* | 7/2021 | de Haas | ................... | H04B 1/40 |
| 2021/0288801 A1* | 9/2021 | Kulkarni | .............. | H04L 9/0631 |
| 2022/0191040 A1* | 6/2022 | Schulter | .................... | H04L 9/12 |
| 2022/0388512 A1* | 12/2022 | Hayes | ................. | B60W 50/14 |
| 2023/0278651 A1* | 9/2023 | Genter | ................... | B60L 58/14 |
| | | | | 180/14.1 |
| 2024/0333492 A1* | 10/2024 | Badrinarayanan | .... | H04L 9/3013 |

\* cited by examiner

900

| 904 |
| --- |
| GENERATING A CAN DATA |

906
OBFUSCATING THE CAN DATA TO GENERATE AN OBFUSCATING CAN DATA

908
TRANSMITTING THE OBFUSCATING CAN DATA

910
RECEIVING THE OBFUSCATING CAN DATA AT A NODE OR A MAIN MICRO

912
DE-OBFUSCATING THE OBFUSCATING CAN DATA TO GENERATE THE CAN DATA

OBFUSCATING DATA IN CONTROLLER AREA NETWORK MESSAGES FOR TRANSPORT REFRIGERATION UNITS

CROSS-REFERENCE TO RELATED APPLICATIONS

This application claims the benefit of U.S. Provisional Application No. 63/332,113 filed Apr. 18, 2022, all of which are incorporated herein by reference in their entirety.

BACKGROUND

The embodiments herein generally relate to transport refrigeration units, and more specifically, to communications systems and methods of transport refrigeration units.

Refrigerated vehicles and trailers are commonly used to transport perishable goods. A transport refrigeration unit is commonly mounted to the vehicles or to the trailer in operative association with a cargo space defined within the vehicles or trailer for maintaining a controlled temperature environment within the cargo space.

BRIEF DESCRIPTION

According to one embodiment, a method of securing communications in a transport refrigeration unit is provided. The method includes generating a CAN data; obfuscating the CAN data to generate an obfuscated CAN data; transmitting the obfuscated CAN data; receiving the obfuscated CAN data by at least one of a node or a main micro; and de-obfuscating the obfuscated CAN data to generate the CAN data.

In addition to one or more of the features described above, or as an alternative, further embodiments of may include operating the node in accordance with the CAN data.

In addition to one or more of the features described above, or as an alternative, further embodiments of may include adjusting operation of the node in accordance with the CAN data.

In addition to one or more of the features described above, or as an alternative, further embodiments of may include that the obfuscating the CAN data to generate the obfuscated CAN is completed using an exclusive OR function.

In addition to one or more of the features described above, or as an alternative, further embodiments of may include that the de-obfuscating the obfuscated CAN data to generate the CAN data is completed using the exclusive OR function.

In addition to one or more of the features described above, or as an alternative, further embodiments of may include that the de-obfuscating the obfuscated CAN data to generate the CAN data is completed using the exclusive OR function and a pre-defined key.

According to another embodiment, a communication system for a transport refrigeration unit is provided. The communication system includes a main micro configured to generate a CAN data, obfuscate the CAN data transmitted from the main micro, and de-obfuscate the CAN data received at the main micro; and a node in communication with the main micro, the node being configured to de-obfuscate the CAN data received at the node, the CAN data being transmitted from the main micro.

In addition to one or more of the features described above, or as an alternative, further embodiments of may include that the node is configured to generate a CAN data and obfuscate the CAN data transmitted from the node.

In addition to one or more of the features described above, or as an alternative, further embodiments of may include a CAN bus harness connecting the main micro and the node.

In addition to one or more of the features described above, or as an alternative, further embodiments of may include that the node is configured to operate in accordance with the CAN data.

In addition to one or more of the features described above, or as an alternative, further embodiments of may include that the node is configured to adjust operation in accordance with the CAN data.

In addition to one or more of the features described above, or as an alternative, further embodiments of may include that the main micro is configured to obfuscate the CAN data using an exclusive OR function.

In addition to one or more of the features described above, or as an alternative, further embodiments of may include that the node is configured to de-obfuscate the CAN data using the exclusive OR function.

In addition to one or more of the features described above, or as an alternative, further embodiments of may include that the node is configured to de-obfuscate the CAN data using the exclusive OR function and a pre-defined key.

According to an embodiment, a computer program product tangibly embodied on a non-transitory computer readable medium of a transport refrigeration unit is provided. The computer program product including instructions that, when executed by a processor, cause the processor to perform operations including: generating a CAN data; obfuscating the CAN data to generate an obfuscated CAN data; transmitting the obfuscated CAN data; receiving the obfuscated CAN data by at least one of: a node or a main micro; and de-obfuscating the obfuscated CAN data to generate the CAN data.

In addition to one or more of the features described above, or as an alternative, further embodiments of may include that the operations further include: operating the node in accordance with the CAN data.

In addition to one or more of the features described above, or as an alternative, further embodiments of may include that the operations further include: adjusting operation of the node in accordance with the CAN data.

In addition to one or more of the features described above, or as an alternative, further embodiments of may include that the obfuscating the CAN data to generate the obfuscated CAN is completed using an exclusive OR function.

In addition to one or more of the features described above, or as an alternative, further embodiments of may include that the de-obfuscating the obfuscated CAN data to generate the CAN data is completed using the exclusive OR function.

In addition to one or more of the features described above, or as an alternative, further embodiments of may include that the de-obfuscating the obfuscated CAN data to generate the CAN data is completed using the exclusive OR function and a pre-defined key.

Technical effects of embodiments of the present disclosure include obfuscating CAN data prior to sending it and de-obfuscating when it is received.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Transportation refrigeration units may utilize controller area network (CAN) messages to communicate amongst components. However, CAN data may be intercepted by sniffers. Embodiments disclosed herein seek to obfuscate the CAN data being sent in transport refrigeration units and then de-obfuscate the data when received.

Figure 1:
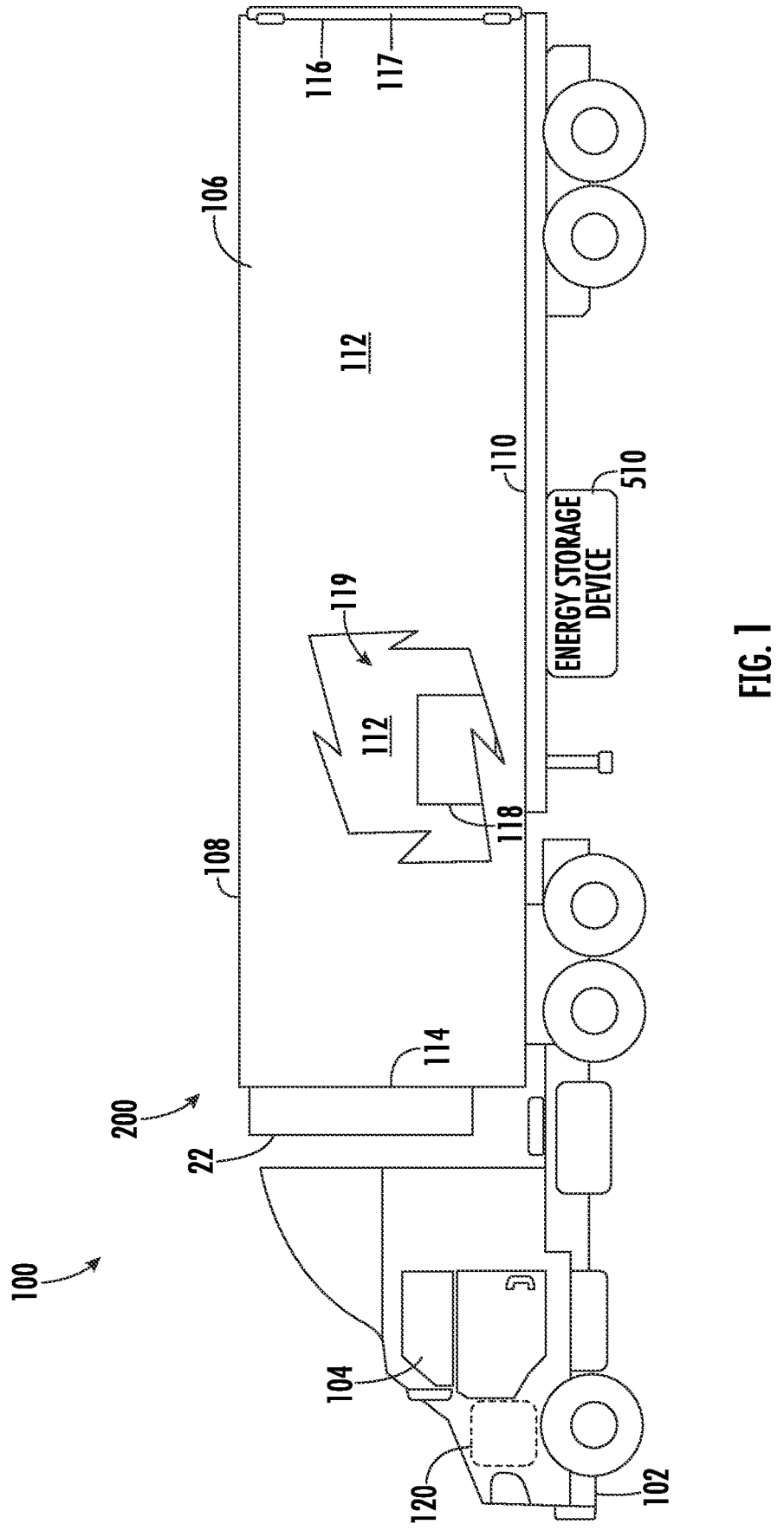
FIG. 1 is a schematic illustration of an exemplary transport refrigeration system, according to an embodiment of the present disclosure.

Referring now to FIG. 1, a schematic view of a transport refrigeration system 200 is illustrated, according to an embodiment of the present disclosure. The transport refrigeration system 200 is being illustrated as a trailer system 100, as seen in FIG. 1. The trailer system 100 includes a vehicle 102 integrally connected to a transport container 106. The vehicle 102 includes an operator's compartment or cab 104 and a propulsion motor 120 which acts as the drive system of the trailer system 100. The propulsion motor 120 is configured to power the vehicle 102. The energy source that powers the propulsion motor 120 may be at least one of compressed natural gas, liquefied natural gas, gasoline, electricity, diesel, hydrogen, electricity from a fuel cell, a electricity from a hydrogen fueled proton exchange membrane (PEM) fuel cell, electricity from a battery, electricity from a generator, or any combination thereof. The propulsion motor 120 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration unit 22 is in operative association with the refrigerated cargo space 119 and is configured to provide conditioned air to the transport container 106.

The transport refrigeration unit 22 may be powered by an energy storage device 510. The energy storage device 510 may be attached to the trailer system 100. The energy storage device 510 may be attached to a bottom of the trailer system 100.

Figure 2:
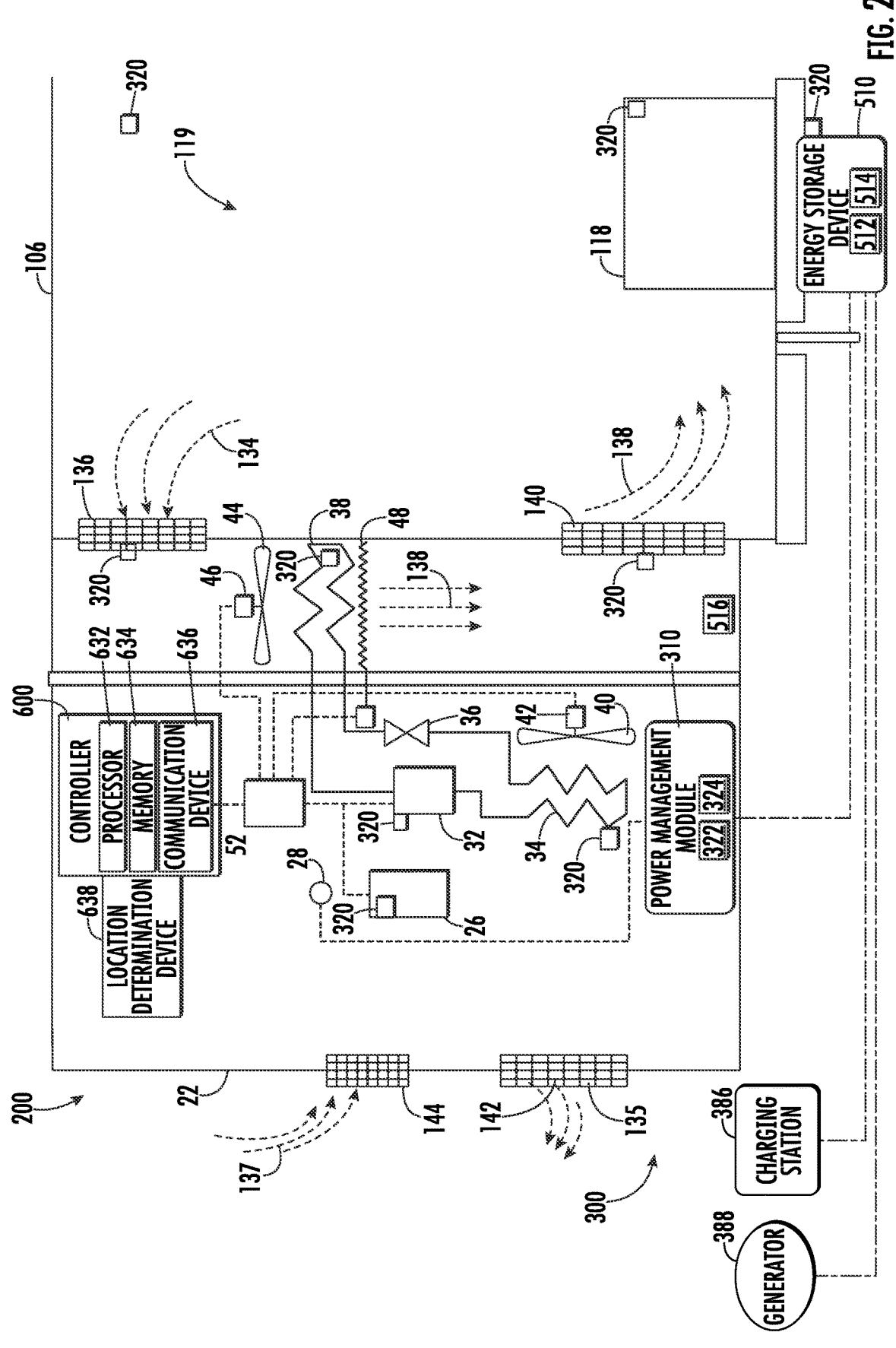
FIG. 2 is an enlarged schematic illustration of an exemplary transport refrigeration unit of the transport refrigeration system of FIG. 1, according to an embodiment of the present disclosure.

Referring now to FIG. 2, with continued reference to FIG. 1, an enlarged schematic view of the transport refrigeration system 200 is illustrated, according to an embodiment of the present disclosure. The transport refrigeration system 200 includes a transport refrigeration unit 22, a refrigerant compression device 32, an electric motor 26 for driving the refrigerant compression device 32, a controller 600, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The transport refrigeration unit 22 functions, under the control of the controller 600, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transport refrigeration unit 22 is capable of providing a desired temperature and humidity range.

The transport refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transport refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transport refrigeration unit 22 is operating in a subcritical refrigerant cycle or as a refrigerant gas cooler, such as if the transport refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat absorption heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerated cargo space 119 of the transport container 106 by means of the transport refrigeration unit 22. A return air 134 flows into the transport refrigeration unit 22 from the refrigerated cargo space 119 through the transport refrigeration unit return air intake 136, and across the refrigerant heat absorption heat exchanger 38 via the fan 44, thus conditioning the return air 134 to a selected or predetermined temperature. The return air 134, now referred to as conditioned air 138, is supplied into the refrigerated cargo space 119 of the transport container 106 through the transport refrigeration unit outlet 140. Heat 135 is removed from the refrigerant heat rejection heat exchanger 34 through the heat outlet 142. The transport refrigeration unit 22 may contain an external air inlet 144, as shown in FIG. 2, to aid in the removal of heat 135 from the refrigerant heat rejection heat exchanger 34 by pulling in external air 137. The conditioned air 138 may cool the perishable goods 118 in the refrigerated cargo space 119 of the transport container 106. It is to be appreciated that the transport refrigeration unit 22 can further be operated in reverse to warm the transport container 106 when, for example, the outside temperature is very low. In the illustrated embodiment, the return air intake 136, the transport refrigeration unit outlet 140, the heat outlet 142, and the external air inlet 144 are configured as grilles to help prevent foreign objects from entering the transport refrigeration unit 22.

The transport refrigeration system 200 also includes a controller 600 configured for controlling the operation of the transport refrigeration system 200 including, but not limited to, the operation of various components of the refrigerant unit 22 to provide and maintain a desired thermal environment within the refrigerated cargo space 119. The controller 600 may also be able to selectively operate the electric motor 26. The controller 600 may be an electronic controller including a processor 632 and an associated memory 634 comprising computer-executable instructions that, when executed by the processor 632, cause the processor 632 to perform various operations. The processor 632 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 634 may be a storage device such as, for example, a random access memory (RAM), read only memory (ROM), or other electronic, optical, magnetic or any other computer readable medium.

It is understood that while transport refrigeration unit 22 is described and illustrated herein as being powered by the energy storage device 510, it is understood that the transport refrigeration unit 22 may be powered by any power source known to one of skill in the art. The transport refrigeration unit 22 may be powered by the energy storage device 510, a power generation device, a power storage device, and/or any other power source known to one of skill in the art. Other power sources may include combustion engines, fuel cells, solar cells, hybrid engines, or any other power source known to one of skill in the art.

In one embodiment, the energy storage device 510 may be located outside of the transport refrigeration unit 22. In another embodiment, the energy storage device 510 may be located within the transport refrigeration unit 22.

The energy storage device 510 may include a battery system 512, a capacitor 514, and/or any other electricity storage system known to one of skill in the art. The battery system 512 may comprise, chemical batteries, lithium-ion batteries, solid state batteries, flow batteries, or any other type of battery known to one of skill in the art. The battery system 512 may employ multiple batteries organized into battery banks. The capacitor 514 may be an electrolytic capacitor, a mica capacitor, a paper capacitor a film capacitor, a non-polarized capacitor, a ceramic capacitor, or any type of capacitor known to one of skill in the art.

The energy storage device 510 may be charged by a stationary charging station 386 such as, for example a three-phase 460 Vac (60 Hz) or 400 Vac (50 Hz) power outlet. The charging station 386 may provide single phase (e.g., level 2 charging capability) or three phase AC power to the energy storage device 510. It is understood that the charging station 386 may have any phase charging and embodiments disclosed herein are not limited to single phase or three phase AC power. In an embodiment, the charging station may be a high voltage DC power, such as, for example, 500 VDC. One function of the charging station 386 is to balance the cell voltage of individual cells of the battery system at some regular cadence.

A thermal storage system 516 may be present to sink electrical energy into in order to cool the transport container 106. The thermal storage system 516 may utilize a phase change material, heat transfer fluids, or thermochemical reactions to provide cooling to the transport container 106. For example, the thermal storage system 516 may utilize electricity to change the phase change material from one phase to another phase to cool the transport container 106. The thermal storage system 516 may be an ice generation system to create ice to cool the transport container 106. The thermal storage system 516 may be an ice generation system to create ice to cool the transport container 106. The ice generation system may generate ice when electricity is available or plentiful to provide lasting cooling for the transport container 106 to conserve electricity later by reducing use of the compression device 32 for cooling.

The transport refrigeration unit 22 has a plurality of electrical power demand loads on the energy storage device 510, including, but not limited to, the electric motor 26 for the compression device 32, the fan motor 42 for the fan 40 associated with the refrigerant heat rejection heat exchanger 34, and the fan motor 46 for the fan 44 associated with the refrigerant heat absorption heat exchanger 38. As each of the fan motors 42, 46 and the electric motor 26 may be an AC motor or a DC motor, it is to be understood that various power converters 52, such as AC to DC rectifiers, DC to AC inverters, AC to AC voltage/frequency converters, and DC to DC voltage converters, may be employed in connection with or without the energy storage device 510 as appropriate. In the depicted embodiment, the heater 48 also constitutes an electrical power demand load. The electric resistance heater 48 may be selectively operated by the controller 600 whenever a control temperature within the temperature controlled cargo box drops below a preset lower temperature limit, which may occur in a cold ambient environment. In such an event the controller 600 would activate the heater 48 to heat air circulated over the heater 48 by the fan(s) 44 associated with the refrigerant heat absorption heat exchanger 38. The heater 48 may also be used to de-ice the return air intake 136. Additionally, the electric motor 26 being used to power the refrigerant compression device 32 constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage coming into the transport refrigeration unit 22.

The power demand loads of the transport refrigeration unit 22 may be managed and fulfilled by a power supply system 300. The power supply system 300 may be configured to provide electricity to power the transport refrigeration system 200. The power supply system may store and/or generate electricity. The power supply system 300 may include the energy storage device 510 and the power management module 310.

The power supply system 300 may also include a generator 388 (e.g., a hub generator, an axle generator), a solar panel, a battery system, the propulsion motor 120 of the vehicle 102, or any other power supply system known to one of skill in the art. The generator 388 may be a hub generator or a wheel generator operably connect to a wheel or axle of the transport container 106 that is configured to generator electricity during the slowing of the vehicle 102 or the downward descent of the vehicle 102. The generator 388 may serve as part of the power supply system 300 and assist in generating supplemental electricity for the power supply system 300 as required.

The power management module 310 may be an electronic controller including a processor 324 and an associated memory 322 comprising computer-executable instructions (i.e., computer program product) that, when executed by the processor 324, cause the processor 324 to perform various operations. The processor 324 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 322 may be but is not limited to a random access memory (RAM), read only memory (ROM), or other electronic, optical, magnetic or any other computer readable medium. While the power management module 310 is being illustrated and described herein as a separate electronic controller the embodiments described herein are applicable to the power management module 310 being incorporated as software within the controller 600 of the transport refrigeration unit 22.

FIG. 2 also illustrates an enlarged view of the transport refrigeration system 200, according to an embodiment of the present disclosure. It should be appreciated that, although particular systems are separately defined in the schematic block diagrams, each or any of the systems may be otherwise combined or separated via hardware and/or software.

The transportation refrigeration unit 22, as illustrated, may include the controller 600 of the transport refrigeration unit 22, one or more sensors 320, and a location determination device 638. The one or more sensors 320 that may be distributed throughout the transport refrigeration unit 22 and the refrigerated cargo space 119. For example, the sensors 320 may be located on in the transport container 106, proximate or on the perishable goods 118, proximate or on the return air intake 136, proximate or on the refrigeration unit outlet 140, proximate or on the refrigerant heat absorption heat exchanger 38, proximate or on the refrigerant heat rejection heat exchanger 34, proximate or on the refrigerant compression device 32, proximate or on the electric motor 26, proximate or on the energy storage device 510, or any other conceivable location that may require sensing. Each sensor 320 is configured to detect operational data and transmit the operational data. Operational data may include temperature, pressure, speed, operational parameters of the component that the sensor 320 is attached to, operational inputs from an operator, humidity, voltage, current, charge level, flow, solar radiation, VOC levels, refrigerant or gas leaks, vibration, door opening status, occupancy/cargo load levels, or any other similar parameter known to one of skill in the art. Some of the sensors 320 may be located in the vehicle 102 and may be in local communication with the controller 600.

The controller 600 is configured to communicate with each sensor 320, every component of the transport refrigeration unit 22, and the power management module 310 through CAN communication messages as will be discussed further herein. The controller 600 includes a communication device 636 to enable this communication. The communication device 636 may be capable of CAN communication via main CAN wiring harness 750 (see FIG. 3), as will be discussed further herein.

The transport refrigeration unit 22 may include the location determination device 638. The location determination device 638 may be located in the controller 600, a sensor 320, or any other component of the transport refrigeration unit 22. Alternatively, the location determination device 638 may be a separate standalone component in communication with the controller 600.

The location determination device 638 that may be configured to determine location data 385 of the transport refrigeration unit 22 using cellular signal triangulation, a global position system (GPS), or any location termination method known to one of skill in the art. The location data 385 may include a longitude and latitude location, and an altitude. Advantageously, the location data 385 may be useful to determine where the transport refrigeration unit 22 is located in its present route, which may help determine where it is going and how best to control the transport refrigeration unit 22, as discussed further herein.

Figure 3:
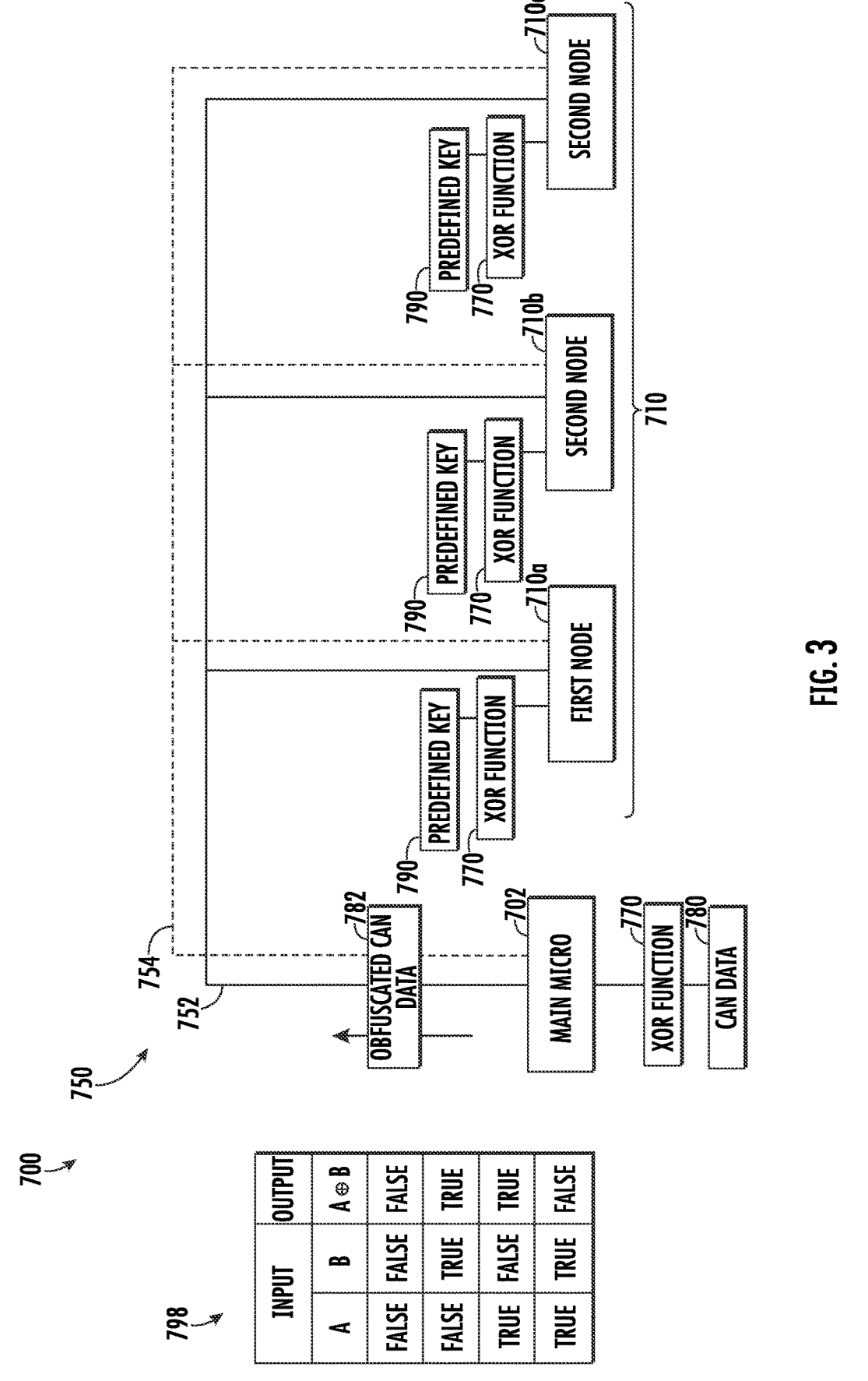
FIG. 3 is an exemplary communication system for the transport refrigeration unit, according to an embodiment of the present disclosure.

Referring now to FIG. 3, with continued reference to FIG. 1, an enlarged schematic view of a communication system 700 for the transport refrigeration unit is illustrated, according to an embodiment of the present disclosure. The communication system 700 includes a main micro 702 and one or more nodes 710. The main micro 702 may be the communication device 636 of the controller 600 of the transport refrigeration unit 22. The nodes 710 may include a first node 710a, a second node 710b, and a third node 710c. It is understood that while three nodes 710 are illustrated and described, the embodiments disclosed herein are applicable to any number of nodes 710. The nodes 710 may be referred to collectively using the reference numeral 710 and individually using reference numerals 710a, 710b, and 710c. The nodes 710 may be the power management module 310, and/or any device of the transportation refrigeration unit 22 including but not limited to sensors 320, the refrigerant compression device 32, the electric motor 26, fan motor 46, fan motor 42, main micro module (not shown), input module (not shown), output module (not shown), stepper module (not shown), stepper input output module (not shown), communications module (not shown), power module (not shown), display module (Cab, Standard, Remote, and Graphical) (not shown), or any other component of the transport refrigeration unit 22 known to one of skill in the art.

The main micro 702 may be hardwired to each of the nodes 710 using a CAN bus harness 750. The CAN bus harness 750 may include a CAN high wire 754 and a CAN low wire 752.

The communication device 636 is configured to use an exclusive OR (XOR) function to obfuscate the data in a CAN data 780. Obfuscate may be defined as rendering the data values unclear or invalid. The entire message in the CAN data 780 may not be changed, just the input, output, and sensor data. The command and control messages may not be changes. The CAN data 780 is then transmitted through the CAN bus harness 750 to the other nodes 710. The nodes are configured to de-obfuscate the obfuscated CAN data 782 using the XOR function 770 and a pre-defined key 790. The pre-defined key 790 may be a 128-byte key 790. The same key may be compiled into all modules of the system and if you want to change the pre-defined key 790 then you would have to change on a system level. The XOR function 770 is installed directly on the main micro 702 and the nodes 710.

The main micro 702 is configured to set the enable position and the start position Advantageously, having the main micro 702 set the enable position and the start position makes it harder for hackers to "Guess" the pre-defined key 790, due to the CAN format having only 1-8 data bytes.

The CAN data 780 is combined with a random array of data (key) which returns an obfuscated array, using the Boolean XOR function 770 a table 798 may be generated in FIG. 3.

The obfuscated CAN data 782 is reciprocal, which means that the XOR function 770 may be used to obfuscate the CAN data 780 to make obfuscated CAN data 782 and then de-obfuscate the obfuscated CAN data 782 to turn back into the CAN data 780 that can be used by the node 710.

In one example, the predetermined key may be {0x43, 0x41,0x52,0x52,0x49,0x45,0x52,0x21}, the CAN data 782 may be {0x30, 0x31, 0x32, 0x33, 0x30, 0x31, 0x32, 0x33}, and then the obfuscated CAN data 782 may be {0x73, 0x70, 0x60, 0x61, 0x79, 0x74, 0x60, 0x12}. When the obfuscated CAN data 782 is de-obfuscated then it returns to the CAN data 782 {0x30, 0x31, 0x32, 0x33, 0x30, 0x31, 0x32, 0x33}. Obscuring the data may utilize the XOR symbol ("^"), such as, for example Result=(DATE^key).

Figure 4:
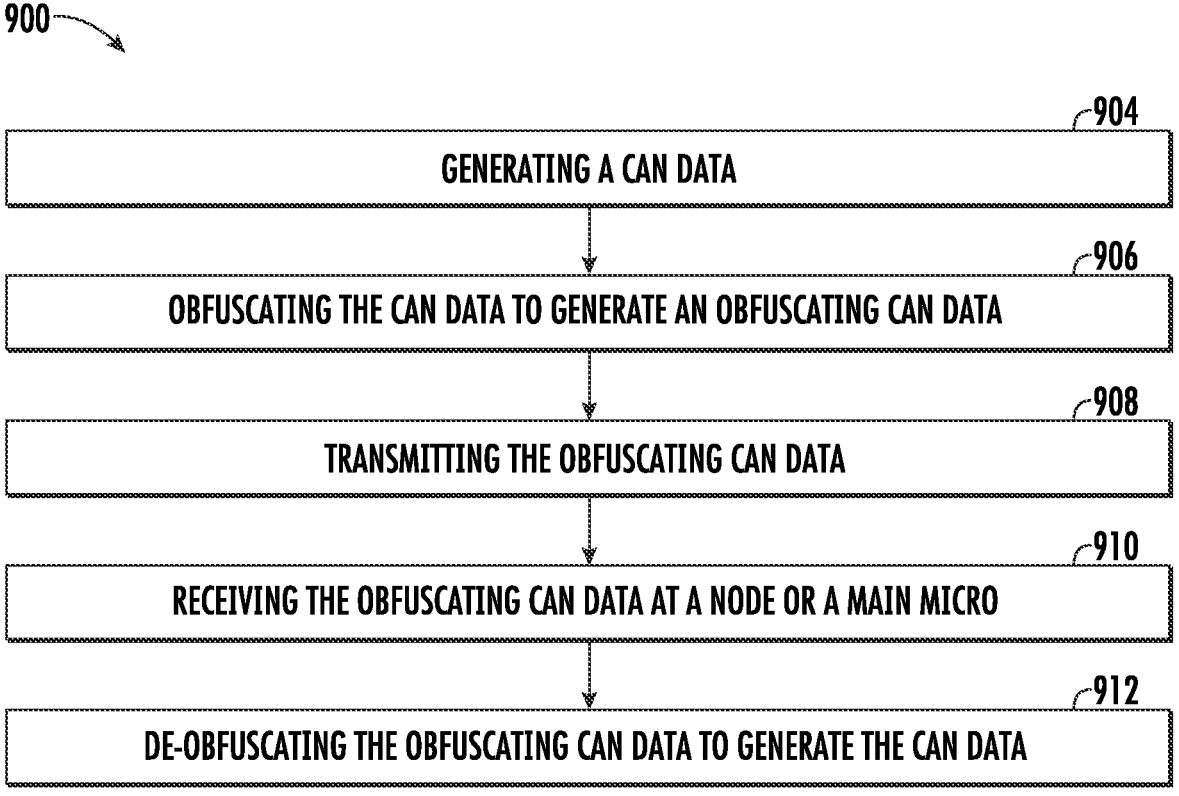
FIG. 4 is a flow process illustrating an exemplary method of communication in a transport refrigeration unit, according to an embodiment of the present disclosure.

Referring now to FIG. 4, with continued reference to FIGS. 1-3. A flow process of a method 900 of communication within a transport refrigeration unit is illustrated, according to an embodiment of the present disclosure.

At block 904, a CAN data 780 is generated.

At block 906, the CAN data 780 is obfuscated to generate an obfuscated CAN data 782. The CAN data 780 may be obfuscated using an exclusive OR function 770 and/or and a pre-defined key 790.

At block 908, the obfuscated CAN data 782 is transmitted.

At block 910, the obfuscated CAN data 782 is received at a node 710 or a main micro 702.

At block 912, the obfuscated CAN data 782 is de-obfuscated to generate the CAN data 780. The de-obfuscated CAN data 782 may be de-obfuscated using an exclusive OR function 770 and/or and a pre-defined key 790.

The method 900 may further include that the node 710 is operated in accordance with the CAN data 782.

The method 900 may also include that operation of the node 710 is adjusted in accordance with the CAN data.

While the above description has described the flow process of FIG. 4, in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of securing communications in a transport refrigeration unit, the method comprising:

generating, by a controller of the transport refrigeration unit, a controlled area network (CAN) data including an input, an output, sensor data and command and control messages;

obfuscating, by the controller, the CAN data to generate an obfuscated CAN data, wherein the obfuscating the CAN data to generate the obfuscated CAN data is completed using an exclusive OR function, wherein the input, the output and the sensor data are obfuscated and the command and control messages are not obfuscated;

transmitting, by the controller, the obfuscated CAN data;

receiving the obfuscated CAN data by a node associated with the transport refrigeration unit; and de-obfuscating the obfuscated CAN data, by the node to generate the CAN data, wherein the de-obfuscating the obfuscated CAN data to generate the CAN data is completed using the exclusive OR function and a predefined key.

2. The method of claim 1, further comprising:

operating the node in accordance with the CAN data.

3. The method of claim 1, further comprising:

adjusting operation of the node in accordance with the CAN data.

4. The method of claim 1, wherein:

the node is configured to generate a further CAN data, obfuscate the further CAN data and transmit obfuscated further CAN data to the controller; and the controller is configured to receive the obfuscated further CAN data and de-obfuscate the obfuscated further CAN data received at the controller;

wherein the node is configured to obfuscate the further CAN data using the exclusive OR function, and the controller is configured to de-obfuscate the obfuscated further CAN data using the exclusive OR function and the predefined key.

5. A communication system for a transport refrigeration unit, the communication system comprising:

a controller associated with the transport refrigeration unit, the controller configured to generate a controlled area network (CAN) data including an input, an output, sensor data and command and control messages, obfuscate the CAN data and transmit obfuscated CAN data from the controller, wherein the input, the output and the sensor data are obfuscated and the command and control messages are not obfuscated; and a node in communication with the controller, the node being configured to receive the obfuscated CAN data and de-obfuscate the obfuscated CAN data received at the node;

wherein the controller is configured to obfuscate the CAN data using an exclusive OR function, and the node is configured to de-obfuscate the obfuscated CAN data using the exclusive OR function and a predefined key.

6. The communication system of claim 5, wherein the node is configured to generate a further CAN data and obfuscate the further CAN data transmitted from the node.

7. The communication system of claim 5, further comprising a CAN bus harness connecting the controller and the node.

8. The communication system of claim 5, wherein the node is configured to operate in accordance with the CAN data.

9. The communication system of claim 5, wherein the node is configured to adjust operation in accordance with the CAN data.

10. A non-transitory computer readable medium including instructions that, when executed by a processor, cause the processor to perform operations to execute the method of claim 1.

11. The non-transitory computer readable medium of claim 10, wherein the operations further comprise:

operating the node in accordance with the CAN data.

12. The non-transitory computer readable medium of claim 10, wherein the operations further comprise:

adjusting operation of the node in accordance with the CAN data.

*     *     *     *     *